(12) United States Patent
Lafuente Cerda et al.

(10) Patent No.: US 8,129,441 B2
(45) Date of Patent: Mar. 6, 2012

(54) LOW-VISCOSITY COATING COMPOSITIONS

(75) Inventors: Oscar Lafuente Cerda, Mannheim (DE); Yvonne Heischkel, Mannheim (DE); Michael Vetter, Bobenheim-Roxheim (DE); Reinhold Schwalm, Wachenheim (DE); Nick Gruber, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 279 days.

(21) Appl. No.: 12/446,987

(22) PCT Filed: Nov. 8, 2007

(86) PCT No.: PCT/EP2007/062047
§ 371 (c)(1),
(2), (4) Date: Apr. 24, 2009

(87) PCT Pub. No.: WO2008/055954
PCT Pub. Date: May 15, 2008

(65) Prior Publication Data
US 2009/0326092 A1    Dec. 31, 2009

(30) Foreign Application Priority Data

Nov. 10, 2006 (EP) ................. 06123793

(51) Int. Cl.
*C08F 2/50* (2006.01)
*C08J 3/28* (2006.01)
(52) U.S. Cl. ............ 522/125; 522/90; 522/96; 522/103; 522/107; 522/113; 522/114; 522/120; 522/121; 522/134; 522/135; 522/142; 522/144; 522/100; 522/104; 522/184; 522/186
(58) Field of Classification Search .......... 522/107, 522/113, 114, 120, 135, 142, 144
See application file for complete search history.

(56) References Cited

U.S. PATENT DOCUMENTS

| | | | |
|---|---|---|---|
| 3,992,276 | A | 11/1976 | Powanda et al. |
| 5,086,086 | A | 2/1992 | Brown-Wensley et al. |
| 5,254,603 | A | 10/1993 | Nahm |
| 6,255,400 | B1 | 7/2001 | Itoh et al. |

FOREIGN PATENT DOCUMENTS

| | | |
|---|---|---|
| EP | 0 385 149 | 9/1990 |
| EP | 0 552 795 | 7/1993 |
| EP | 0 919 578 | 6/1999 |

*Primary Examiner* — Sanza McClendon
(74) *Attorney, Agent, or Firm* — Oblon, Spivak, McClelland, Maier & Neustadt, L.L.P.

(57) ABSTRACT

The present invention relates to radiation-curable coating compositions which are of low viscosity and comprise (meth) acrylates and divinyl adipate.

10 Claims, No Drawings

LOW-VISCOSITY COATING COMPOSITIONS

The present invention relates to radiation-curable coating compositions which are of low viscosity and comprise (meth) acrylates and divinyl adipate.

For the surface-coatings industry the search is on continually for coating compositions having a very low viscosity, in order to make application as easy as possible. For this purpose it is common to use solvents and/or reactive diluents.

EP 385149 A2 describes photopolymerizable adhesive compositions which include epoxy acrylates and admixtures of 3.5%-14% of a polyethylenically unsaturated compound. Long lists of such compounds include, among others, vinyl esters and divinyl adipate, although the latter are not explicitly disclosed in the examples (page 7 lines 30-42).

A disadvantage of these adhesives is that they require an aftercure at high temperatures (160° C. for 2 hours; page 8 lines 57-58). Many substrates, however, are damaged at such high temperatures.

EP 552795 A1 describes mixtures of UV-curable resins and vinyl carboxylates, among them divinyl adipate.

A disadvantage is that the mixtures described do not cure fully at vinyl ester contents of more than 20 parts by weight (per 100 parts by weight of resin) (page 30 lines 30-31).

U.S. Pat. No. 3,992,276 describes unsaturated polyester resins which may optionally comprise polyethylenically unsaturated compounds. Vinyl esters are mentioned only as part of broad lists, and are not explicitly disclosed in the examples.

U.S. Pat. No. 5,254,603 describes UV-curable coating compositions which can comprise unsaturated polyester resins and divinyl esters. Examples with divinyl adipate are explicitly disclosed.

The unsaturated polyester resins are only resins comprising internal double bonds, derived for example from maleic acid.

U.S. Pat. No. 5,086,086 describes coating compositions which can comprise ethylenically unsaturated monomers. Divinyl adipate is recited in broad lists, but is not explicitly disclosed in the examples. In addition there may be polyurethane precursors (polyisocyanates and hydroxy-bearing compounds) present. These polyurethanes are curable as two-component coating compositions, by reaction of the isocyanate groups with the hydroxyl groups, but make no contribution to radiation curing.

It was an object of the present invention to provide radiation-curable coating compositions which can be used for low-viscosity formulation of acrylates and can be cured at temperatures below 120° C.

This object has been achieved by means of radiation-curable coating compositions comprising
(A) at least one compound having at least two (meth)acrylate groups which is selected from the group consisting of polyester(meth)acrylate, polyether(meth)acrylate, polycarbonate (meth)acrylate, epoxide(meth)acrylate, and urethane(meth) acrylate,
(B) if appropriate, at least one compound having at least one ethylenically unsaturated group, different than (A),
(C) divinyl adipate,
(D) if appropriate, at least one solvent,
(E) at least one photoinitiator, and
(F) if appropriate, further typical coatings ingredients,
wherein the fraction of divinyl adipate (C) as a proportion of the total of the radiation-curable ingredients (A)+(B)+(C) is at least 20% by weight.

With divinyl adipate it is possible to reduce the viscosity of coating compositions to a greater extent than with other common difunctional reactive diluents. Contrary to the teaching of EP 552795 A1, even coating compositions with a more than 20% by weight divinyl adipate content are readily radiation-curable at temperatures below 120° C.

The compounds (A) comprise at least one compound having at least two (meth)acrylate groups which is selected from the group consisting of polyester(meth)acrylate, polyether (meth)acrylate, polycarbonate(meth)acrylate, epoxide(meth) acrylate, and urethane(meth)acrylate.

Epoxide (meth)acrylates are obtainable by reacting epoxides with (meth)acrylic acid. Suitable epoxides are, for example, epoxidized olefins, aromatic glycidyl ethers or aliphatic glycidyl ethers, preferably those of aromatic or aliphatic glycidyl ethers.

Epoxidized olefins may be, for example, ethylene oxide, propylene oxide, isobutylene oxide, 1-butene oxide, 2-butene oxide, vinyloxirane, styrene oxide or epichlorohydrin, preferably ethylene oxide, propylene oxide, isobutylene oxide, vinyloxirane, styrene oxide or epichlorohydrin, particularly preferably ethylene oxide, propylene oxide or epichlorohydrin and very particularly preferably ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g. 2,5-bis[(2,3-epoxypropoxy)phenyl]octahydro-4, 7-methano-5H-indene) (CAS No. [13446-85-0]), tris[4-(2,3-epoxypropoxy)phenyl]methane isomers (CAS No. [66072-39-7]), phenol-based epoxy novolaks (CAS No. [9003-35-4]) and cresol-based epoxy novolaks (CAS No. [37382-79-9]).

Aliphatic glycidyl ethers are, for example, 1,4-butanediol diglycidyl ether, 1,6-hexane-diol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ethers of polypropylene glycol (α,ω-bis(2,3-epoxypropoxy)poly-(oxypropylene)) (CAS No. [16096-30-3]) and of hydrogenated bisphenol A (2,2-bis[4-(2,3-epoxypropoxy)cyclohexyl]propane) (CAS No. [13410-58-7]).

The epoxide(meth)acrylate is preferably the reaction product of (meth)acrylic acid with bisphenol A diglycidyl ether, bisphenol F diglycidyl ether, 1,4-butanediol diglycidyl ether, 1,6-hexanediol diglycidyl ether, trimethylolpropane triglycidyl ether, penta-erythritol tetraglycidyl ether, 1,1,2,2-tetrakis[4-(2,3-epoxypropoxy)phenyl]ethane (CAS No. [27043-37-4]), diglycidyl ether of polypropylene glycol (α,ω-bis(2,3-epoxypropoxy)-poly(oxypropylene) (CAS No. [16096-30-3]) or of hydrogenated bisphenol A (2,2-bis[4-(2, 3-epoxypropoxy)cyclohexyl]propane, CAS No. [13410-58-7]).

The epoxide(meth)acrylates preferably have a number average molar weight $M_n$ of from 1000 to 20 000, particularly preferably from 1000 to 10 000, g/mol and very particularly preferably from 2000 to 3000 g/mol; the content of (meth) acrylic groups is preferably from 1 to 5, particularly preferably from 2 to 4, per 1000 g of epoxide(meth)acrylate (determined by gel permeation chromatography using polystyrene as a standard and tetrahydrofuran as an eluent).

Polyurethane(meth)acrylates are likewise preferred. These are obtainable, for example, by reaction of hydroxyalkyl (meth)acrylates with isocyanate groups.

Such urethane(meth)acrylates are obtainable, for example, by reacting polyisocyanates with hydroxyalkyl(meth)acrylates and, if appropriate, chain extenders, such as diols, polyols, diamines, polyamines or dithiols or polythiols.

The polyurethane(meth)acrylates preferably comprise as synthesis components:
(a) at least one organic aliphatic, aromatic or cycloaliphatic di- or polyisocyanate,
(b) at least one compound having at least one isocyanate-reactive group and at least one (meth)acrylate group, and
(c) if appropriate, at least one compound having at least two isocyanate-reactive groups.

For example, aliphatic, aromatic and cycloaliphatic di- and polyisocyanates having an NCO functionality of at least 1.8, preferably from 1.8 to 5 and particularly preferably from 2 to 4, and the isocyanurates, biurets, allophanates and uretdiones thereof, are suitable as component (a).

The parent diisocyanates are preferably isocyanates having 4 to 20 carbon atoms. Examples of conventional diisocyanates are aliphatic diisocyanates, such as tetramethylene diisocyanate, 1,5-pentamethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates, such as 1,4-, 1,3- or 1,2-diisocyanatocyclo-hexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanato-methyl)cyclohexane or 2,4- or 2,6-diisocyanato-1-methylcyclohexane, and 3(or 4),8(or 9)-bis(isocyanatomethyl)tricyclo[5.2.1.0$^{2,6}$]decane isomer mixtures, and aromatic diisocyanates, such as toluene 2,4- or 2,6-diisocyanate and the isomer mixtures thereof, m- or p-xylylene diisocyanate, 2,4'- or 4,4'-diisocyanatodiphenylmethane and the isomer mixtures thereof, phenylene 1,3- or 1,4-diisocyanate, 1-chlorophenylene 2,4-diisocyanate, naphthylene 1,5-diisocyanate, biphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or 4,4'-diisocyanatodiphenyl ether.

Cycloaliphatic and aliphatic diisocyanates are preferred.

Particularly preferred are 1-isocyanato-3,3,5-trimethyl-5-(isocyanatomethyl)cyclo-hexane (isophorone diisocyanate), 1,6-diisocyanatohexane, 4,4'-di(isocyanatocyclohexyl)methane, and 3(or 4),8(or 9)-bis(isocyanatomethyl)tricyclo[5.2.1.0$^{2,6}$]decane isomer mixtures.

Polyisocyanates and polyisocyanate-containing mixtures are for example those which contain biuret, allophanate and/or isocyanurate groups, preferably polyisocyanates containing isocyanurate groups and/or polyisocyanates containing allophanate groups. Particular preference is given to polyisocyanates comprising predominantly isocyanurate groups. With very particular preference the fraction of the isocyanurate groups corresponds to an NCO value of at least 5%, preferably at least 10%, more preferably at least 15% by weight (calculated as $C_3N_3O_3$ with a molar mass of 126 g/mol).

Examples of possible polyisocyanates include
1) Polyisocyanates having isocyanurate groups and obtained from aromatic, aliphatic and/or cycloaliphatic diisocyanates. Particularly preferred here are the corresponding aliphatic and/or cycloaliphatic isocyanatoisocyanurates and in particular those based on hexamethylene diisocyanate and isophorone diisocyanate. The isocyanurates present are in particular trisisocyanatoalkyl or trisisocyanatocycloalkyl isocyanurates, which are cyclic trimers of the diisocyanates, or are mixtures with their higher homologs having more than one isocyanurate ring. The isocyanatoisocyanurates generally have an NCO content of from 10 to 30% by weight, in particular from 15 to 25% by weight, and an average NCO functionality of from 2.6 to 8.
2) Uretdione diisocyanates having aromatically, aliphatically and/or cyclo-aliphatically bonded isocyanate groups, preferably having aliphatically and/or cycloaliphatically bonded groups and in particular those derived from hexamethylene diisocyanate or isophorone diisocyanate. Uretdione diisocyanates are cyclic dimerization products of diisocyanates. The uretdione diisocyanates can be used as a sole component or as a mixture with other polyisocyanates, in particular those mentioned under 1).
3) Polyisocyanates having biuret groups and having aromatically, cycloaliphatically or aliphatically bonded, preferably cycloaliphatically or aliphatically bonded, isocyanate groups, in particular tris(6-isocyanatohexyl)biuret or mixtures thereof with its higher homologs. These polyisocyanates having biuret groups generally have an NCO content of from 18 to 22% by weight and an average NCO functionality of from 2.8 to 4.5.
4) Polyisocyanates having urethane and/or allophanate groups and having aromatically, aliphatically or cycloaliphatically bonded, preferably aliphatically or cycloaliphatically bonded, isocyanate groups, as can be obtained, for example, by reaction of excess amounts of hexamethylene diisocyanate or of isophorone diisocyanate with mono- or polyhydric alcohols, such as, for example, methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethyl-hexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol, trimethylol-propane, neopentyl glycol, pentaerythritol, 1,4-butanediol, 1,6-hexanediol, 1,3-propanediol, 2-ethyl-1,3-propanediol, 2-methyl-1,3-propanediol, ethylene glycol, diethylene glycol, triethylene glycol, tetraethylene glycol, pentaethylene glycol, glycerol, 1,2-dihydroxypropane, 2,2-dimethyl-1,2-ethanediol, 1,2-butane-diol, 1,4-butanediol, 3-methylpentane-1,5-diol, 2-ethylhexane-1,3-diol, 2,4-diethyl-octane-1,3-diol, neopentyl glycol hydroxypivalate, ditrimethylolpropane, dipentaerythritol, 2,2-bis(4-hydroxycyclohexyl)propane, 1,1-, 1,2-, 1,3-, and 1,4-cyclohexanedimethanol, 1,2-, 1,3-, or 1,4-cyclohexanediol or mixtures thereof. These polyisocyanates having urethane and/or allophanate groups generally have an NCO content of from 12 to 20% by weight and an average NCO functionality of from 2.5 to 4.5.
5) Polyisocyanates comprising oxadiazinetrione groups, preferably derived from hexamethylene diisocyanate or isophorone diisocyanate. Such polyisocyanates comprising oxadiazinetrione groups can be prepared from diisocyanate and carbon dioxide.
6) Polyisocyanates comprising iminooxadiazinedione groups, preferably derived from hexamethylene diisocyanate or isophorone diisocyanate. Such polyisocyanates comprising iminooxadiazinedione groups can be prepared from diisocyanates by means of specific catalysts.
7) Uretonimine-modified polyisocyanates.
8) Carbodiimide-modified polyisocyanates.
9) Hyperbranched polyisocyanates, of the kind known for example from DE-A1 10013186 or DE-A110013187.
10) Polyurethane polyisocyanate prepolymers, from di- and/or polyisocyanates with alcohols.
11) Polyurea-polyisocyanate prepolymers.

The polyisocyanates 1) to 11) can be used as a mixture, if appropriate also as a mixture with diisocyanates.

Preference is given to polyisocyanates containing isocyanurate and/or allophanate and/or biuret groups.

In addition these mixtures may further contain minor amounts of uretdione, biuret, urethane, allophanate, oxadiazinetrione, iminooxadiazinedione and/or uretonimine groups, preferably in each case below 25%, more preferably below 20%, very preferably below 15%, in particular below 10%, and especially below 5%, and very especially below 2%, by weight, in each case, based on the respective functional group.

Particular suitability as compounds containing isocyanurate groups is possessed by the isocyanurate of isophorone diisocyanate having an NCO content to DIN EN ISO 11909 of 16.7%-17.6%, and/or an average NCO functionality of 3.0 to 4.0, preferably 3.0 to 3.7, more preferably 3.1 to 3.5. Compounds of this kind containing isocyanurate groups preferably have a HAZEN/APHA color number to DIN EN 1557 of not more than 150.

Also of particular suitability as a compound containing isocyanurate groups is the isocyanurate of 1,6-hexamethylene diisocyanate having an NCO content to DIN EN ISO 11909 of 21.5-23.5%, and/or an average NCO functionality of 3.0 to 4.0, preferably 3.0 to 3.7, more preferably 3.1 to 3.5. Compounds of this kind containing isocyanurate groups preferably have a color number to DIN ISO 6271 of not more than 60. Compounds of this kind containing isocyanurate groups preferably have a viscosity at 23° C. to DIN EN ISO 3219 of 1000 to 4000 mPas for a shear rate of 2500 s$^{-1}$.

In one preferred embodiment the diisocyanates and/or polyisocyanates have a total chlorine content of less than 400 mg/kg, more preferably a total chlorine content of less than 80 mg/kg, very preferably less than 60, in particular less than 40, especially less than 20, and even less than 10 mg/kg.

Compounds suitable as component (b) are those which carry at least one isocyanate-reactive group and at least one group capable of free radical polymerization.

Isocyanate-reactive groups may be, for example, —OH, —SH, —NH$_2$ and —NHR$^a$, where R$^a$ is hydrogen or an alkyl group comprising 1 to 4 carbon atoms, such as, for example, methyl, ethyl, n-propyl, isopropyl, n-butyl, isobutyl, sec-butyl or tert-butyl.

Components (b) may be, for example, monoesters of acrylic or methacrylic acid, preferably acrylic acid, (meth)acrylic acid for short in this specification, with di- or polyols, which preferably have 2 to 20 carbon atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly-THF having a molar weight of from 162 to 2000, poly-1,3-propanediol having a molar weight of from 134 to 400 or polyethylene glycol having a molar weight of from 238 to 458. It is furthermore possible to use esters or amides of (meth)acrylic acid with amino alcohols, e.g. 2-aminoethanol, 2-(methyl-amino)ethanol, 3-amino-1-propanol, 1-amino-2-propanol or 2-(2-aminoethoxy)ethanol, 2-mercaptoethanol or polyaminoalkanes, such as ethylenediamine or diethylene-triamine.

Additionally, polyetherols or polyesterols or polyacrylate-polyols having an average OH functionality of from 2 to 10 are also suitable.

Examples of amides of (meth)acrylic acid with amino alcohols are hydroxyalkyl(meth)-acrylamides, such as N-hydroxymethylacrylamide, N-hydroxymethylmethacrylamide, N-hydroxyethylacrylamide, N-hydroxyethylmethacrylamide, and 5-hydroxy-3-oxapentyl-(meth)acrylamide.

2-Hydroxyethyl(meth)acrylate, 2- or 3-hydroxypropyl (meth)acrylate, 1,4-butanediol mono(meth)acrylate, neopentyl glycol mono(meth)acrylate, 1,5-pentanediol mono(meth)acrylate, 1,6-hexanediol mono(meth)acrylate, glyceryl mono- and di(meth)acrylate, trimethylolpropane mono- and di(meth)acrylate, pentaerythrityl mono-, di- and tri(meth)acrylate, 2-aminoethyl(meth)acrylate, 2-aminopropyl(meth)acrylate, 3-aminopropyl(meth)acrylate, 4-aminobutyl(meth)acrylate, 6-aminohexyl(meth)acrylate, 2-thioethyl(meth)acrylate, 2-aminoethyl(meth)acrylamide, 2-aminopropyl(meth)acrylamide, 3-aminopropyl(meth)acrylamide, 2-hydroxyethyl(meth)acrylamide, 2-hydroxypropyl(meth)acrylamide or 3-hydroxypropyl(meth)acrylamide are preferably used. 2-Hydroxyethyl acrylate, 2-hydroxyethyl methacrylate, 2- or 3-hydroxypropyl acrylate, 1,4-butanediol monoacrylate and 3-(acryloyloxy)-2-hydroxypropyl methacrylate are particularly preferred.

Compounds which are suitable as component (c) are those which have at least two isocyanate-reactive groups, for example —OH, —SH, —NH$_2$ or —NHR$^b$, where R$^b$ therein, independently of one another, may be hydrogen, methyl, ethyl, isopropyl, n-propyl, n-butyl, isobutyl, sec-butyl or tert-butyl.

These are preferably diols or polyols, such as hydrocarbondiols having 2 to 20 carbon atoms, e.g. ethylene glycol, 1,2-propanediol, 1,3-propanediol, 1,1-dimethylethane-1,2-diol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, etc., esters thereof with short-chain dicarboxylic acids, such as adipic acid or cyclohexanedicarboxylic acid, carbonates thereof, prepared by reaction of the diols with phosgene or by transesterification with dialkyl or diaryl carbonates, or aliphatic diamines, such as methylene- and isopropylidenebis(cyclohexylamine), piperazine, 1,2-, 1,3- or 1,4-diaminocyclohexane, 1,2-, 1,3- or 1,4-cyclohexanebis(methylamine), etc., dithiols or polyfunctional alcohols, secondary or primary amino alcohols, such as ethanolamine, diethanolamine, monopropanolamine, dipropanolamine, etc., or thioalcohols, such as thioethylene glycol.

Diethylene glycol, triethylene glycol, dipropylene glycol, tripropylene glycol, neopentyl glycol, pentaerythritol, 1,2- and 1,4-butanediol, 1,5-pentanediol, 2-methyl-1,5-pentanediol, 2-ethyl-1,4-butanediol, 1,2-, 1,3- and 1,4-dimethylolcyclohexane, 2,2-bis(4-hydroxycyclohexyl)propane, glycerol, trimethylolethane, trimethylolpropane, trimethylolbutane, dipentaerythritol, ditrimethylolpropane, erythritol and sorbitol, 2-aminoethanol, 3-amino-1-propanol, 1-amino-2-propanol or 2-(2-aminoethoxy)ethanol, bisphenol A or butanetriol are furthermore conceivable.

Additionally, polyetherols or polyesterols or polyacrylate-polyols having an average OH functionality of 2 to 10, and polyamines, such as, for example, polyethyleneimine, or polymers of, for example, poly-N-vinylformamide which comprise free amine groups, are also suitable.

The cycloaliphatic diols, such as, for example, bis(4-hydroxycyclohexane)-isopropylidene, tetramethylcyclobutanediol, 1,2-, 1,3- or 1,4-cyclohexanediol, cyclooctanediol or norbornanediol, are particularly suitable here.

The polyurethanes which can be used are obtained by reacting the components (a), (b) and (c) with one another.

The molar composition (a):(b):(c) per 3 mol of reactive isocyanate groups in (a) is as a rule as follows:
(b) 1.5-3.0, preferably 1.5-2.5, particularly preferably 1.5-2.0 and in particular 1.6-1.8 mol of isocyanate-reactive groups and
(c) 0-1.5, preferably 0.5-1.5, particularly preferably 0.7-1.5 and in particular 0.8-1.5 mol of isocyanate-reactive groups.

The formation of the adduct from the compound containing isocyanate groups and the compound which comprises groups reactive toward isocyanate groups is effected, as a rule, by mixing the components in any desired sequence, if appropriate at elevated temperature.

Preferably, the compound which comprises groups reactive toward isocyanate groups is added to the compound containing isocyanate groups, preferably in a plurality of steps.

Particularly preferably, the compound containing isocyanate groups is initially taken and the compounds which comprise isocyanate-reactive groups are added. In particular, the compound (a) containing isocyanate groups is initially taken and then (b) is added. If appropriate, desired further components can subsequently be added.

As a rule, the reaction is carried out at temperatures between 5 and 100° C., preferably between 20 and 90° C. and particularly preferably between 40 and 80° C. and in particular between 60 and 80° C.

The procedure is preferably carried out under anhydrous conditions. Here, anhydrous means that the water content in the reaction system is not more than 5% by weight, preferably not more than 3% by weight and particularly preferably not more than 1% by weight.

In order to suppress polymerization of the polymerizable double bonds, the procedure is preferably carried out under an oxygen-containing gas, particularly preferably air or air/nitrogen mixtures.

Air or a mixture of oxygen or air and a gas which is inert under the conditions of use can preferably be used as the oxygen-containing gas. Nitrogen, helium, argon, carbon monoxide, carbon dioxide, steam, lower hydrocarbons or mixtures thereof can be used as the inert gas.

The oxygen content of the oxygen-containing gas may be, for example, from 0.1 to 22% by volume, preferably from 0.5 to 20, particularly preferably from 1 to 15, very particularly preferably from 2 to 10 and in particular from 4 to 10% by volume. If desired, higher oxygen contents can of course also be used.

The reaction can also be carried out in the presence of an inert solvent, e.g. acetone, isobutyl methyl ketone, toluene, xylene, butyl acetate or ethoxyethyl acetate. However, the reaction is preferably carried out in the absence of a solvent.

The urethane(meth)acrylates preferably have a number average molar weight $M_n$ from 1000 to 20 000, in particular from 1000 to 10 000, particularly preferably from 1000 to 4000, g/mol (determined by gel permeation chromatography using tetrahydrofuran and polystyrene as standard).

The urethane(meth)acrylates preferably contain from 1 to 5, particularly preferably from 2 to 4, mol of (meth)acrylic groups per 1000 g of urethane(meth)acrylate.

In a preferred embodiment, compounds used are those as described in WO 00/39183, page 4, line 3 to page 10, line 19, the disclosure of which is hereby incorporated in the present document. Particularly preferred among these are those compounds which have, as synthesis components, at least one (cyclo)aliphatic isocyanate having allophanate groups and at least one hydroxyalkyl(meth)acrylate, very particularly preferably products 1 to 9 in table 1 on page 24 of WO 00/39183.

Additionally, suitable radiation-curable compounds are carbonate (meth)acrylates which comprise on average preferably from 1 to 5, in particular from 2 to 4, particularly preferably 2 or 3, (meth)acrylic groups and very particularly preferably 2 (meth)acrylic groups.

The number average molecular weight $M_n$ of the carbonate (meth)acrylates is preferably from 2000 to 3000 g/mol (determined by gel permeation chromatography using polystyrene as a standard and tetrahydrofuran as a solvent).

The carbonate (meth)acrylates are obtainable in a simple manner by transesterification of carbonic esters with polyhydric, preferably dihydric, alcohols (diols, e.g. hexanediol) and subsequent esterification of the free OH groups with (meth)acrylic acid, or transesterification with (meth)acrylic esters, as described, for example, in EP-A 92 269. They are also obtainable by reacting phosgene, urea derivatives with polyhydric, e.g. dihydric, alcohols.

(Meth)acrylates of polycarbonatepolyols, such as the reaction product of one of said di- or polyols and a carbonic ester and also a hydroxyl-containing (meth)acrylate, are also conceivable.

Suitable carbonic esters are, for example, ethylene or 1,2- or 1,3-propylene carbonate or dimethyl, diethyl or dibutyl carbonate.

Suitable hydroxyl-containing (meth)acrylates are, for example, 2-hydroxyethyl(meth)acrylate, 2- or 3-hydroxypropyl(meth)acrylate, 1,4-butanediol mono(meth)-acrylate, neopentyl glycol mono(meth)acrylate, glyceryl mono- and di(meth)acrylate, trimethylolpropane mono- and di(meth)acrylate and pentaerythrityl mono-, di- and tri(meth)acrylate.

Particularly preferred carbonate (meth)acrylates are those of the formula:

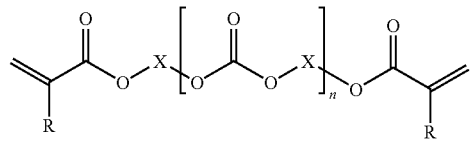

where R is H or $CH_3$, X is a $C_2$-$C_{18}$ alkylene group and n is an integer from 1 to 5, preferably from 1 to 3.

R is preferably H and X is preferably $C_2$ to $C_{10}$ alkylene, for example 1,2-ethylene, 1,2-propylene, 1,3-propylene, 1,4-butylene or 1,6-hexylene, particularly preferably $C_4$ to $C_8$ alkylene. Very particularly preferably, X is $C_6$ alkylene.

They are preferably aliphatic carbonate (meth)acrylates.

Polyester (meth)acrylates may furthermore be mentioned as (meth)acrylate compounds, these being the (meth)acrylic esters of polyesterols.

Polyesterpolyols are known, for example, from Ullmanns Enzyklopädie der technischen Chemie, 4th Edition, Volume 19, pages 62 to 65. Polyesterpolyols which are obtained by reacting dihydric alcohols with dibasic carboxylic acids are preferably used. Instead of the free polycarboxylic acids, it is also possible to use the corresponding polycarboxylic anhydrides or corresponding polycarboxylic esters of lower alcohols or mixtures thereof for the preparation of the polyesterpolyols. The polycarboxylic acids may be aliphatic, cycloaliphatic, araliphatic, aromatic or heterocyclic and, if appropriate, may be, for example, substituted by halogen atoms and/or unsaturated. The following may be mentioned as examples of these:
oxalic acid, succinic acid, glutaric acid, adipic acid, sebacic acid, dodecanedioic acid, o-phthalic acid, isophthalic acid, terephthalic acid, trimellitic acid, azelaic acid, 1,4-cyclohexanedicarboxylic acid or tetrahydrophthalic acid, suberic acid, azelaic acid, phthalic anhydride, tetrahydrophthalic anhydride, hexahydrophthalic anhydride, tetrachlorophthalic anhydride, endomethylenetetrahydrophthalic anhydride, glutaric anhydride, dimeric fatty acids, the isomers and hydrogenation products thereof and esterifiable derivatives, such as anhydrides or dialkyl esters, for example $C_1$-$C_4$-alkyl esters, preferably methyl, ethyl or n-butyl esters, of said acids are used. Dicarboxylic acids of the general formula HOOC—$(CH_2)_y$—COOH, where y is a number from 1 to 20, preferably an even number from 2 to 20, are preferred, succinic acid, adipic acid, sebacic acid and dodecanedicarboxylic acid being particularly preferred.

Suitable polyhydric alcohols for the preparation of the polyesterols are 1,2-propanediol, ethylene glycol, 2,2-dimethyl-1,2-ethanediol, 1,3-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, poly-THF having a molar mass between 162 and 2000, poly-1,3-propanediol having a molar mass between 134 and 1178, poly-1,2-propanediol having a molar mass between 134 and 898, polyethylene glycol having a molar mass between 106 and 458, neopentyl glycol, neopentyl glycol hydroxy-pivalate, 2-ethyl-1,3-propanediol, 2-methyl-1,3-propanediol, 2,2-bis(4-hydroxycyclohexyl)propane, 1,1-, 1,2-, 1,3- and 1,4-cyclohexanedimethanol, 1,2-, 1,3- or 1,4-cyclo-hexanediol, trimethylolbutane, trimethylolpropane, trimethylolethane, neopentyl glycol, pentaerythritol, glycerol, ditrimethylolpropane, dipentaerythritol, sorbitol, mannitol, diglycerol, threitol, erythritol, adonitol (ribitol), arabitol (lyxitol), xylitol, dulcitol (galactitol), maltitol or isomalt.

Alcohols of the general formula HO—$(CH_2)_x$—OH, where x is a number from 1 to 20, preferably an even number from 2 to 20, are preferred. Ethylene glycol, butane-1,4-diol, hexane-1,6-diol, octane-1,8-diol and dodecane-1,12-diol are preferred. Neopentyl glycol is furthermore preferred.

Polycarbonatediols, as can be obtained, for example, by reacting phosgene with an excess of the low molecular weight alcohols mentioned as synthesis components for the polyesterpolyols, are furthermore suitable.

Lactone-based polyesterdiols are also suitable, these being homo- or copolymers of lactones, preferably adducts of lactones with suitable difunctional initiator molecules, which adducts have terminal hydroxyl groups. Preferred lactones are those which are derived from compounds of the general formula HO—$(CH_2)_z$—COOH, where z is a number from 1 to 20 and an H atom of a methylene unit may also be substituted by a $C_1$- to $C_4$-alkyl radical. Examples are ε-caprolactone, β-propiolactone, gamma-butyrolactone and/or methyl-ε-caprolactone, 4-hydroxybenzoic acid, 6-hydroxy-2-naphthalenic acid or pivalolactone and mixtures thereof. Suitable initiator components are, for example, the low molecular weight dihydric alcohols mentioned above as a synthesis component for the polyesterpolyols. The corresponding polymers of ε-caprolactone are particularly preferred. Lower polyesterdiols or polyetherdiols can also be used as initiators for the preparation of the lactone polymers. Instead of the polymers of lactones, it is also possible to use the corresponding, chemically equivalent polycondensates of the hydroxycarboxylic acids corresponding to the lactones.

Polyester (meth)acrylates can be prepared in a plurality of stages or in one stage, as described, for example, in EP 279 303, from acrylic acid, polycarboxylic acid and polyol.

The compounds (A) are preferably selected from the group consisting of epoxide(meth)acrylates, urethane(meth)acrylates, polyester(meth)acrylates, and polyether(meth)acrylates, more preferably from the group consisting of urethane (meth)acrylates and polyether(meth)acrylates, and very preferably the compound is at least one polyether(meth)acrylate.

The compound (B) is at least one compound having at least one ethylenically unsaturated group, different than (A).

The compounds in question are preferably compounds having one or two ethylenically unsaturated groups, preferably (meth)acrylate groups.

These compounds preferably have a number average molecular weight of less than 2000 g/mol (determined by gel permeation chromatography using polystyrene as a standard).

Examples are $C_1$-$C_{20}$ alkyl(meth)acrylates, vinylaromatics having up to 20 carbon atoms, vinyl esters of carboxylic acids comprising up to 20 carbon atoms, ethylenically unsaturated nitriles, vinyl ethers of alcohols comprising 1 to 10 carbon atoms and aliphatic hydrocarbons having 2 to 20, preferably 2 to 8, carbon atoms and 1 or 2 double bonds.

Preferred alkyl(meth)acrylates are those having a $C_1$-$C_{10}$ alkyl radical, such as methyl methacrylate, methyl acrylate, n-butyl acrylate, ethyl acrylate and 2-ethylhexyl acrylate.

Mixtures of the alkyl(meth)acrylates are also particularly suitable.

Vinyl esters of carboxylic acids having 1 to 20 carbon atoms are, for example, vinyl laurate, vinyl stearate, vinyl propionate and vinyl acetate.

Suitable vinylaromatic compounds are, for example, vinyltoluene, α-butylstyrene, 4-n-butylstyrene, 4-n-decylstyrene and preferably styrene.

Examples of nitriles are acrylonitrile and methacrylonitrile.

Suitable vinyl ethers are, for example, vinyl methyl ether, vinyl isobutyl ether, vinyl hexyl ether and vinyl octyl ether.

Butadiene, isoprene and ethylene, propylene and isobutylene may be mentioned as nonaromatic hydrocarbons having 2 to 20, preferably 2 to 8, carbon atoms and one or two olefinic double bonds.

Compounds capable of free radical polymerization and having a plurality of ethylenically unsaturated groups are preferred.

These are in particular (meth)acrylate compounds, with the acrylate compounds, i.e., the derivatives of acrylic acid, being preferred in each case.

(Meth)acrylic esters and in particular acrylic esters of polyfunctional alcohols, in particular those which comprise no further functional groups or at most ether groups apart from the hydroxyl groups, may be mentioned as (meth)acrylate compounds. Examples of such alcohols are, for example, bifunctional alcohols, such as ethylene glycol, propylene glycol and the representatives thereof having a higher degree of condensation, for example such as diethylene glycol, triethylene glycol, dipropylene glycol, tripropylene glycol, etc., butanediol, pentanediol, hexanediol, neopentyl glycol, alkoxylated phenolic compounds, such as ethoxylated or propoxylated bisphenols, cyclohexanedimethanol, trifunctional and higher-functional alcohols, such as glycerol, trimethylolpropane, trimethylolethane, neopentyl glycol, pentaerythritol, glycerol, ditrimethylolpropane, dipentaerythritol, sorbitol, mannitol, diglycerol, 1,2-propanediol, ethylene glycol, 2,2-dimethyl-1,2-ethanediol, neopentyl glycol, 1,3-propanediol, 1,2-butanediol, 1,4-butanediol, butanetriol, sorbitol, mannitol and the corresponding alkoxylated, in particular ethoxylated and propoxylated, alcohols.

The alkoxylation products are obtainable in a known manner by reaction of the above alcohols with alkylene oxides, for example ethylene oxide, propylene oxide, butylene oxide, isobutylene oxide and vinyloxirane, in any desired sequence or as a mixture, preferably ethylene oxide and/or propylene oxide and particularly preferably ethylene oxide. The degree of alkoxylation per hydroxyl group is preferably from 0 to 10, i.e., 1 mol of hydroxyl group can preferably be alkoxylated with up to 10 mol of alkylene oxides.

Polyether alcohols containing vinyl ether groups are obtained, for example, in a corresponding manner by reaction of hydroxyalkyl vinyl ethers with alkylene oxides.

Polyether alcohols containing (meth)acrylic acid groups can be obtained, for example, by transesterification of (meth) acrylic esters with the polyether alcohols, by esterification of the polyether alcohols with (meth)acrylic acid or by use of hydroxyl-containing (meth)acrylates as described above under (b).

Preferred polyether(meth)acrylates are the completely (meth)acrylated, preferably acrylated, esters of ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, poly-THF having a molar weight of from 162 to 2000, poly-1,3-propanediol having a molar weight of from 134 to 400 or polyethylene glycol having a molar weight of from 238 to 458.

The polyols in question are preferably alkoxylated polyols of the formulae (Ia) to (Id)

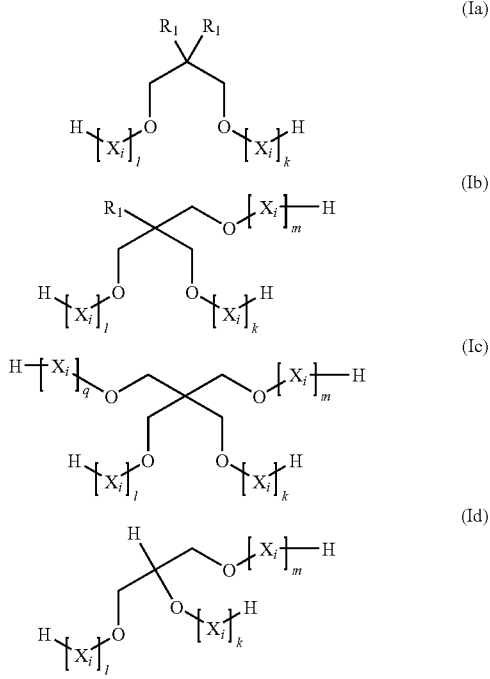

in which
$R^1$ and $R^2$ independently of one another are hydrogen or unsubstituted or aryl-, alkyl-, aryloxy-, alkyloxy-, heteroatom- and/or heterocycle-substituted $C_1$-$C_{18}$ alkyl,
k, l, m, and q independently of one another are each an integer from 1 to 10, preferably 1 to 5, and more preferably 1 to 3, and each $X_i$ for i=1 to k, 1 to l, 1 to m, and 1 to q may be selected, independently of any other, from the group —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—CHVin-O—, —CHVin-$CH_2$—O—, —$CH_2$—CHPh-O—, and —CHPh-$CH_2$—O—, preferably from the group —$CH_2$—$CH_2$—O—, —$CH_2$—$CH(CH_3)$—O—, and —$CH(CH_3)$—$CH_2$—O—, and more preferably —$CH_2$—$CH_2$—O—,
in which Ph is phenyl and Vin is vinyl.

In these definitions, $C_1$-$C_{18}$ alkyl unsubstituted or substituted by aryl, alkyl, aryloxy, alkyloxy, heteroatoms and/or heterocycles is for example methyl, ethyl, propyl, isopropyl, n-butyl, sec-butyl, tert-butyl, pentyl, hexyl, heptyl, octyl, 2-ethylhexyl, 2,4,4-trimethylpentyl, decyl, dodecyl, tetradecyl, hexadecyl, octadecyl, 1,1-dimethylpropyl, 1,1-dimethylbutyl, 1,1,3,3-tetramethylbutyl, preferably methyl, ethyl or n-propyl, very preferably methyl or ethyl.

Preference is given here to (meth)acrylates of singly to vigintuply and more preferably triply to decuply ethoxylated, propoxylated or mixedly ethoxylated and propoxylated, and, in particular, exclusively ethoxylated, neopentyl glycol, trimethylolpropane, trimethylolethane or pentaerythritol.

Preferred multifunctional polymerizable compounds are ethylene glycol diacrylate, 1,2-propanediol diacrylate, 1,3-propanediol diacrylate, 1,4-butanediol diacrylate, 1,6-hexanediol diacrylate, trimethylolpropane triacrylate, pentaerythritol tetraacrylate, polyesterpolyol acrylates, polyetherol acrylates, and triacrylate of singly to vigintuply alkoxylated, more preferably ethoxylated, trimethylolpropane.

Especially preferred multifunctional polymerizable compounds are 1,4-butanediol diacrylate, 1,6-hexanediol diacrylate, trimethylolpropane triacrylate, pentaerythritol tetraacrylate, and triacrylate of singly to vigintuply ethoxylated trimethylolpropane.

(C) The purity of the divinyl adipate employed (adipic acid divinyl ester, 1,6-hexanedioic acid di(ethenyl) ester, CAS 4074-90-2) plays no part essential to the invention. Generally speaking, a purity of at least 90% is sufficient, preferably at least 95%, more preferably at least 98%, and very preferably at least 99%.

The divinyl adipate can be prepared in any desired way. The preparation is not essential to the invention.

The mixture may further comprise at least one solvent (D). This may be, for example, esters, such as butyl acetate or ethyl acetate, aromatic or (cyclo)aliphatic hydrocarbons, such as xylene, toluene or heptane, ketones, such as acetone, isobutyl methyl ketone, methyl ethyl ketone or cyclohexanone, alcohols such as ethanol, isopropanol, mono- or lower oligoethylene or -propylene glycols, singly or doubly etherified ethylene or propylene glycol ethers, glycol ether acetates, such as methoxypropyl acetate, cyclic ethers such as tetrahydrofuran, carboxamides such as dimethylformamide or N-methylpyrrolidone, and/or water, for example.

Preferably there is no solvent present.

Photoinitiators (D) which can be used are photoinitiators known to the skilled worker, examples being those given in "Advances in Polymer Science", Volume 14, Springer Berlin 1974 or in K. K. Dietliker, Chemistry and Technology of UV- and EB-Formulation for Coatings, Inks and Paints, Volume 3; Photoinitiators for Free Radical and Cationic Polymerization, P. K. T. Oldring (Ed.), SITA Technology Ltd, London.

Suitable examples include phosphine oxides, benzophenones, α-hydroxyalkyl aryl ketones, thioxanthones, anthraquinones, acetophenones, benzoins and benzoin ethers, ketals, imidazoles or phenylglyoxylic acids.

Phosphine oxides are for example mono- or bisacylphosphine oxides, such as Irgacure® 819 (bis(2,4,6-trimethylbenzoyl)phenylphosphine oxide), as are described for example in EP-A 7 508, EP-A 57 474, DE-A 196 18 720, EP-A 495 751 or EP-A 615 980, examples being 2,4,6-trimethylbenzoyl-diphenylphosphine oxide (Lucirin® TPO), ethyl 2,4,6-trimethylbenzoylphenylphosphinate, and bis(2,6-dimethoxybenzoyl)-2,4,4-trimethylpentylphosphine oxide;

benzophenones are for example benzophenone, 4-aminobenzophenone, 4,4'-bis-(dimethylamino)benzophenone, 4-phenylbenzophenone, 4-chlorobenzophenone, Michler's ketone, o-methoxybenzophenone, 2,4,6-trimethylbenzophenone, 4-methyl-benzophenone, 2,4-dimethylbenzophenone, 4-isopropylbenzophenone, 2-chlorobenzophenone, 2,2'-dichlorobenzophenone, 4-methoxybenzophenone, 4-propoxybenzophenone or 4-butoxybenzophenone;

α-hydroxyalkyl aryl ketones are for example 1-benzoylcyclohexan-1-ol (1-hydroxycyclo-hexyl phenyl ketone), 2-hydroxy-2,2-dimethylacetophenone (2-hydroxy-2-methyl-1-phenylpropan-1-one), 1-hydroxyacetophenone, 1-[4-(2-hydroxyethoxy)phenyl]-2-hydroxy-2-methyl-1-propan-1-one, and polymer comprising 2-hydroxy-2-methyl-1-(4-isopropen-2-ylphenyl)propan-1-one in copolymerized form (Esacure® KIP 150);

xanthones and thioxanthones are for example 10-thioxanthenone, thioxanthen-9-one, xanthen-9-one, 2,4-dimethylthioxanthone, 2,4-diethylthioxanthone, 2,4-diisopropyl-thioxanthone, 2,4-dichlorothioxanthone, and chloroxanthenone;

anthraquinones are for example β-methylanthraquinone, tert-butylanthraquinone, anthraquinonecarbonyl acid esters, benz[de]anthracen-7-one, benz[α]anthracene-7,12-dione, 2-methylanthraquinone, 2-ethylanthraquinone, 2-tert-butylanthraquinone, 1-chloroanthraquinone, and 2-amylanthraquinone;

acetophenones are for example acetophenone, acetonaphthoquinone, valerophenone, hexanophenone, α-phenylbutyrophenone, p-morpholinopropiophenone, dibenzo-suberone, 4-morpholinobenzophenone, p-diacetylbenzene, 4'-methoxyacetophenone, α-tetralone, 9-acetylphenanthrene, 2-acetylphenanthrene, 3-acetylphenanthrene, 3-acetylindole, 9-fluorenone, 1-indanone, 1,3,4-triacetylbenzene, 1-acetonaphthone, 2-acetonaphthone, 2,2-dimethoxy-2-phenylacetophenone, 2,2-diethoxy-2-phenyl-acetophenone, 1,1-dichloroacetophenone, 1-hydroxyacetophenone, 2,2-diethoxy-acetophenone, 2-methyl-1-[4-(methylthio)phenyl]-2-morpholinopropan-1-one, 2,2-dimethoxy-1,2-diphenylethan-2-one, and 2-benzyl-2-dimethylamino-1-(4-morpholinophenyl)butan-1-one;

benzoins and benzoin ethers are for example 4-morpholinodeoxybenzoin, benzoin, benzoin isobutyl ether, benzoin tetrahydropyranyl ether, benzoin methyl ether, benzoin ethyl ether, benzoin butyl ether, benzoin isopropyl ether, and 7-H-benzoin methyl ether;

ketals are for example acetophenone dimethyl ketal, 2,2-diethoxyacetophenone, and benzyl ketals, such as benzyl dimethyl ketal;

phenylglyoxylic acids are for example as described in DE-A 198 26 712, DE-A 199 13 353 or WO 98/33761.

As photoinitiators it is also possible to employ benzaldehyde, methyl ethyl ketone, 1-naphthaldehyde, triphenylphosphine, tri-o-tolylphosphine, and 2,3-butanedione.

Examples of photoinitiator mixtures are 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclo-hexyl phenyl ketone, 2,4,6-trimethylbenzoyldiphenylphosphine oxide and 2-hydroxy-2-methyl-1-phenylpropan-1-one, and also 2,4,6-trimethylbenzophenone and 4-methyl-benzophenone, 2,4,6-trimethylbenzophenone and 4-methylbenzophenone and 2,4,6-trimethylbenzoyl-diphenylphosphine oxide.

Further typical coatings ingredients used are for example antioxidants, stabilizers, activators (accelerants), fillers, pigments, dyes, antistats, flame retardants, thickeners, thixotropic agents, surface-active agents, viscosity modifiers, plasticizers or chelating agents.

In addition it is possible to add one or more thermally activable initiators, such as potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzopinacol, and also, for example, those thermally activable initiators which have a half-life at 80° C. of more than 100 hours, such as di-tert-butyl peroxide, cumene hydroperoxide, dicumyl peroxide, tert-butyl perbenzoate, silylated pinacols, available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Further examples of suitable initiators are described in "Polymer Handbook", 2nd ed., Wiley & Sons, New York.

Suitable thickeners, besides free-radically (co)polymerized (co)polymers, include typical organic and inorganic thickeners such as hydroxymethylcellulose or bentonite.

As chelating agents it is possible for example to use ethylenediamineacetic acid and its salts, and also β-diketones.

Suitable fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Suitable stabilizers comprise typical UV absorbers such as oxanilides, triazines, and benzotriazole (the latter available as Tinuvin® products from Ciba-Spezialitätenchemie) and benzophenones. These stabilizers can be used alone or together with suitable free-radical scavengers, examples being sterically hindered amines such as 2,2,6,6-tetramethylpiperidine, 2,6-di-tert-butylpiperidine or their derivatives, e.g. bis(2,2,6,6-tetramethyl-4-piperidyl) sebacate. Stabilizers are used typically in amounts of 0.1% to 5.0% by weight, based on the solid components present in the preparation.

The term "pigments" is used collectively in the context of this specification for pigments in the true sense, effect pigments, functional additives, dyes and/or fillers, preferably for pigments in the true sense and fillers, and more preferably for pigments in the true sense.

Pigments in the true sense, according to CD Römpp Chemie Lexikon—Version 1.0, Stuttgart/New York: Georg Thieme Verlag 1995, referring to DIN 55943, are particulate, organic or inorganic, chromatic or achromatic colorants which are virtually insoluble in the application medium.

Virtually insoluble here means a solubility at 25° C. of below 1 g/1000 g of application medium, preferably below 0.5, more preferably below 0.25, very preferably below 0.1, and in particular below 0.05 g/1000 g of application medium.

Examples of pigments in the true sense comprise any desired systems of absorption pigments and/or effect pigments, preferably absorption pigments. There are no restrictions imposed on the number or selection of the pigment components. The components can be adapted as desired to the particular requirements, such as the desired impression of color, for example. It is possible, by way of example, for all of the pigment components of a standardized mixer paint system to form the basis.

By effect pigments are meant all pigments which exhibit a platelet-shaped construction and impart specific decorative color effects to a surface coating. The effect pigments are, for example, all effect-imparting pigments which can typically be employed in vehicle finishing and industrial coating.

Examples of such effect pigments are pure metal pigments, such as aluminum pigments (silver bronze), iron pigments, copper pigments, copper/zinc pigments (gold bronzes), and zinc pigments, especially metallic effect pigments of the kind comprising metal that can be oriented in parallel and then, by reflection of the light on the metal flakes, exhibit a metallic luster; interference pigments, whose coloring effect derives entirely or predominantly from the phenomenon of interference, and pearlescent pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The coloring absorption pigments are, for example, typical organic or inorganic absorption pigments which can be employed in the coatings industry. Examples of organic absorption pigments are azo pigments, phthalocyanine pigments, quinacridone pigments, and pyrrolopyrrole pigments. Examples of inorganic absorption pigments are iron oxide pigments and carbon black.

Dyes are likewise colorants and differ from the pigments in their solubility in the application medium, i.e., they have a solubility at 25° C. of above 1 g/1000 g in the application medium.

Examples of dyes are azo, azine, anthraquinone, acridine, cyanine, oxazine, polymethine, thiazine, and triarylmethane dyes. These dyes may be employed as basic or cationic dyes, mordant, direct, dispersion, ingrain, vat, metal complex, reactive, acid, sulfur, coupling or substantive dyes.

Coloristically inert fillers are all substances/compounds which on the one hand are coloristically inactive—that is, they exhibit low intrinsic absorption and have a refractive index similar to that of the coating medium—and, on the other hand, are capable of influencing the orientation (parallel alignment) of the effect pigments in the surface coating, i.e., in the applied coating film, in addition to properties of the coating or of the coating compositions, such as UV stability, hardness or rheology. Specified below are inert substances/compounds which can be employed by way of example, but without restriction of the concept of coloristically inert, topology-influencing fillers to these examples.

Suitable inert fillers meeting the definition may be, for example, transparent or semitransparent fillers or pigments, such as silica gels, blanc fixe, kieselguhr, talc, calcium carbonates, kaolin, barium sulfate, magnesium silicate, aluminum silicate, crystalline silicon dioxide, amorphous silica, diamond, garnet, pumice, tripel, silicon carbide, emery, aluminum oxides, such as corundum (α-aluminum oxide), kieselguhr, sand (abrasive sands), gypsum, boron carbide, borides, carbides, nitrides, zirconium dioxide or cerium oxide, microspheres, or hollow microspheres, made for example of glass, ceramic or polymers, with sizes of 0.1-50 μm for example. Further inert fillers which can be used are any desired solid, inert, organic particles, such as urea-formaldehyde condensation products, micronized polyolefin wax, and micronized amide wax, for example. The inert fillers may in each case also be employed in a mixture. Preferably, however, only one filler is employed in each case.

Suitable UV protection pigments are those which protect the layers surrounding them and below them against UV radiation-induced degradation. Examples include zinc oxide and titanium dioxide.

In addition the coating composition may comprise at least one light stabilizer. This may be at least one free-radical scavenger and/or at least one UV absorber. UV absorbers are compounds which absorb electromagnetic radiation in the wavelength range from 280 to 440 nm and convert it, generally by radiationless deactivation, into heat.

The compounds in question may for example be 2-(2-hydroxyphenyl)-2H-benzo-triazoles, hydroxybenzophenones, (2-hydroxyphenyl)-s-triazines or oxalanilides. Preferred UV stabilizers are recited in WO 2004/46234, page 3 line 36 to page 6 line 3, fully incorporated here by reference.

Examples of light stabilizers are free-radical scavengers, such as sterically hindered amines, for example.

The coating compositions of the invention have for example the following constitution:

(A) 20%-80% by weight, preferably 30% to 80%, more preferably 40% to 75%, and very preferably 50% to 70% by weight, (B) 0% to 25% by weight, preferably 0% to 20%, more preferably 0% to 15%, and very preferably 0% to 10% by weight, (C) 20%-80% by weight, preferably 20% to 70%, more preferably 25% to 60%, and very preferably 30% to 50% by weight, (D) 0% to 25% by weight, preferably 0% to 20%, more preferably 0% to 15%, and very preferably 0% to 10% by weight, (E) 0.1% to 5% by weight, preferably 0.2% to 5%, more preferably 0.3% to 4%, and very preferably 0.5% to 3% by weight, (F) 0% to 50% by weight, preferably 5% to 50%, more preferably 10% to 40%, and very preferably 20% to 30% by weight, with the proviso that the sum always amounts to 100% by weight.

Coating of the substrates with the coating compositions of the invention takes place in accordance with customary methods which are known to the skilled worker and involve applying a coating composition of the invention, or a coating formulation comprising it, to the target substrate in the desired thickness, and, if appropriate, drying it. This operation may if desired be repeated one or more times. Application to the substrate may take place in a known way, such as for example by spraying, troweling, knifecoating, brushing, rolling, roller coating, pouring, laminating, injection-backmolding or coextruding. The coating thickness is generally in a range from about 3 to 1000 g/m² and preferably 10 to 200 g/m².

Additionally disclosed is a method of coating substrates which involves adding, if appropriate, further, typical coatings additives and thermally curable, chemically curable or radiation-curable resins to a coating composition of the invention or to a coating formulation comprising it, applying the resulting formulation to the substrate, drying it if appropriate, and curing it with electron beams or by UV exposure under an oxygen-containing atmosphere or, preferably, under inert gas, with thermal treatment if appropriate at temperatures up to the level of the drying temperature, and subsequently at temperatures up to 120° C., preferably between 60 and 120° C., more preferably between 80 and 120° C.

Radiation curing takes place with high-energy light, UV light for example, or electron beams, preferably UV light. Radiation curing may take place at relatively high temperatures, preferably at temperatures up to 120° C., more preferably up to 100° C. The temperature ought to be at least room temperature (23° C.).

Radiation curing here means the free-radical polymerization of polymerizable compounds as a result of electromagnetic and/or particulate radiation, preferably UV light in the wavelength range of x=200 to 700 nm and/or electron beams in the range from 150 to 300 keV, and more preferably with a radiation dose of at least 80, preferably 80 to 3000 mJ/cm$^2$.

If appropriate, if a plurality of layers of the coating material are applied one on top of another, drying and/or radiation curing may take place after each coating operation.

Examples of suitable radiation sources for the radiation cure are low-pressure mercury lamps, medium-pressure mercury lamps with high-pressure lamps, and fluorescent tubes, pulsed lamps, metal halide lamps, electronic flash units, with the result that radiation curing is possible without a photoinitiator, or excimer lamps. The radiation cure is accomplished by exposure to high-energy radiation, i.e., UV radiation, or daylight, preferably light in the wavelength range of λ=200 to 700 nm, more preferably λ=200 to 500 nm, and very preferably λ=250 to 400 nm, or by exposure to high-energy electrons (electron beams; 150 to 300 keV). Examples of radiation sources used include high-pressure mercury vapor lamps, lasers, pulsed lamps (flash light), halogen lamps or excimer emitters. The radiation dose normally sufficient for crosslinking in the case of UV curing is in the range from 80 to 3000 mJ/cm$^2$.

It will be appreciated that a number of radiation sources can also be used for the cure: two to four, for example.

These sources may also emit each in different wavelength ranges.

Drying and/or thermal treatment may also take place, in addition to or instead of the thermal treatment, by means of NIR radiation, which here refers to electromagnetic radiation in the wavelength range from 760 nm to 2.5 µm, preferably from 900 to 1500 nm.

Irradiation can if appropriate also be carried out in the absence of oxygen, such as under an inert gas atmosphere. Suitable inert gases are preferably nitrogen, noble gases, carbon dioxide, or combustion gases. Furthermore, irradiation may take place by covering the coating composition with transparent media. Examples of transparent media include polymeric films, glass or liquids, water for example. Particular preference is given to irradiation in the manner described in DE-A1199 57 900.

The coating compositions of the invention can be used for coating a variety of substrates, such as wood, wood veneer, paper, paperboard, cardboard, textile, leather, nonwoven, plastics surfaces, glass, ceramic, mineral building materials, and coated or uncoated metals.

Particular preference is given to the use of the coating compositions in primers, surfacers, pigmented topcoat materials, and clearcoat materials in the field of automotive refinish or large-vehicle finishing. Coating compositions of this kind are especially suitable for applications requiring particularly high levels of application reliability, exterior weathering resistance, optical qualities, and solvent, chemical, and water resistance, as in automotive refinish and large-vehicle finishing.

They are especially suitable for use as primers, surfacers, pigmented topcoat materials, and clearcoat materials in the field of industrial coating, wood coating, automotive finishing, especially OEM finishing, or decorative coating. The coating materials are very particularly suitable for applications requiring particularly high levels of application reliability, external weathering resistance, optical qualities, scratch resistance, solvent resistance and/or chemical resistance.

EXAMPLES

The viscosity quoted in the examples was measured in accordance with DIN 53019 part 1 in an ICI cone/plate viscometer at 23° C. and a shear rate of 100 s$^{-1}$.

Example A

An epoxide acrylate with an average molar mass of 520 g/mol (reaction product of acrylic acid with bisphenol A diglycidyl ether (EPA 520)) was mixed with divinyl adipate (ADVE) in five different concentrations (examples A.1-A.5). The table reports the viscosities. For comparison, EPA 520 was mixed with hexanediol diacrylate (HDDA), again in five different concentrations (examples A.6-A.10), in order to investigate the dilution effect with respect to the divinyl adipate.

The radiation-curable composition was prepared by intensely mixing 100 parts by weight of the epoxide acrylate obtained in example A with 4 parts by weight of 1-hydroxycyclohexyl phenyl ketone (commercial photoinitiator Irgacure® 184 from Ciba Spezialitätenchemie).

|   | Example A | % by wt. EPA 520 | % by wt. ADVE | Viscosity [mPa · s] |
|---|---|---|---|---|
| EPA 520 | A.1 | 100 | 0 | 1950 |
| in ADVE | A.2 | 90 | 10 | 90 |
|  | A.3 | 80 | 20 | 6.9 |
|  | A.4 | 70 | 30 | 1.0 |
|  | A.5 | 60 | 40 | 0.9 |
| EPA 520 | A.6 | 100 | 0 | 1950 |
| in HDDA | A.7 | 90 | 10 | 128 |
| comparative | A.8 | 80 | 20 | 17 |
|  | A.9 | 70 | 30 | 2.1 |
|  | A.10 | 60 | 40 | 0.3 |

Example B

A polyfunctional urethane acrylate UA1 was prepared as in example 7 of EP 903363 A1 except that instead of hexanediol diacrylate it was dissolved with divinyl adipate (ADVE) in five different concentrations (examples B.1-B.5). The table reports the viscosities. For comparison, the same urethane acrylate UA1 was prepared with hexanediol diacrylate (HDDA) in five different concentrations (examples B.6-B.10), in order to investigate the dilution effect with respect to the divinyl adipate.

The radiation-curable composition was prepared by intensely mixing 100 parts by weight of the urethane acrylate obtained in example B with 4 parts by weight of 1-hydroxycyclohexyl phenyl ketone (commercial photoinitiator Irgacure® 184 from Ciba Spezialitätenchemie).

|   | Example B | % by wt. UA1 | % by wt. ADVE | Viscosity [mPa · s] |
|---|---|---|---|---|
| UA1 | B.1 | 100 | 0 | 500000 |
| in ADVE | B.2 | 90 | 10 | 87040 |
|  | B.3 | 80 | 20 | 14560 |
|  | B.4 | 70 | 30 | 2840 |
|  | B.5 | 60 | 40 | 720 |

Example C

A commercial mixture of an unsaturated polyester acrylate and epoxide acrylate (Laromer® LR 8800 from BASF AG, Ludwigshafen) was mixed with divinyl adipate (ADVE) in five different concentrations (examples C.1-C.5). The table reports the viscosities. For comparison, Laromer® LR 8800 was mixed with hexanediol diacrylate (HDDA), again in five different concentrations (examples C.6-C.10), in order to investigate the dilution effect with respect to the divinyl adipate.

The radiation-curable composition was prepared by intensely mixing 100 parts by weight of the polyester acrylate obtained in example C with 4 parts by weight of 1-hydroxycyclohexyl phenyl ketone (commercial photoinitiator Irgacure® 184 from Ciba Spezialitätenchemie).

|  | Example C | % by wt. LR 8800 | % by wt. ADVE | Viscosity [mPa·s] |
|---|---|---|---|---|
| LR 8800 in ADVE | C.1 | 100 | 0 | 6400 |
|  | C.2 | 90 | 10 | 1720 |
|  | C.3 | 80 | 20 | 620 |
|  | C.4 | 70 | 30 | 250 |
|  | C.5 | 60 | 40 | 110 |
| LR 8800 in HDDA comparative | C.6 | 100 | 0 | 6400 |
|  | C.7 | 90 | 10 | 1760 |
|  | C.8 | 80 | 20 | 800 |
|  | C.9 | 70 | 30 | 350 |
|  | C.10 | 60 | 40 | 150 |

Example D

A commercial mixture of a polyester acrylate and epoxide acrylate (Laromer® PE 44F from BASF AG, Ludwigshafen) was mixed with divinyl adipate (ADVE) in five different concentrations (examples D.1-D.5). The table reports the viscosities. For comparison, Laromer® PE 44F was mixed with hexanediol diacrylate (HDDA), again in five different concentrations (examples D.6-D.10), in order to investigate the dilution effect with respect to the divinyl adipate.

The radiation-curable composition was prepared by intensely mixing 100 parts by weight of the polyester acrylate obtained in example D with 4 parts by weight of 1-hydroxycyclohexyl phenyl ketone (commercial photoinitiator Irgacure® 184 from Ciba Spezialitätenchemie).

|  | Example D | % by wt. PE 44F | % by wt. ADVE | Viscosity [mPa·s] |
|---|---|---|---|---|
| PE 44F in ADVE | D.1 | 100 | 0 | 3520 |
|  | D.2 | 90 | 10 | 1200 |
|  | D.3 | 80 | 20 | 460 |
|  | D.4 | 70 | 30 | 200 |
|  | D.5 | 60 | 40 | 100 |
| PE 44F in HDDA comparative | D.6 | 100 | 0 | 3520 |
|  | D.7 | 90 | 10 | 1280 |
|  | D.8 | 80 | 20 | 640 |
|  | D.9 | 70 | 30 | 330 |
|  | D.10 | 60 | 40 | 160 |

Example E

An octafunctional urethane acrylate UA2 as in example 1 of WO 2006/069690 was mixed with divinyl adipate (ADVE) in five different concentrations (examples E.1-E.5). The table reports the viscosities. For comparison, UA2 was mixed with hexanediol diacrylate (HDDA), again in five different concentrations (examples E.6-E.10), in order to investigate the dilution effect with respect to the divinyl adipate.

The radiation-curable composition was prepared by intensely mixing 100 parts by weight of the octafunctional urethane acrylate UA2 obtained in example E with 4 parts by weight of 1-hydroxycyclohexyl phenyl ketone (commercial photoinitiator Irgacure® 184 from Ciba Spezialitätenchemie).

|  | Example E | % by wt. UA2 | % by wt. ADVE | Viscosity [mPa·s] |
|---|---|---|---|---|
| UA2 in ADVE | E.1 | 100 | 0 | 224 000 |
|  | E.2 | 90 | 10 | 23 700 |
|  | E.3 | 80 | 20 | 9000 |
|  | E.4 | 70 | 30 | 1600 |
|  | E.5 | 60 | 40 | 400 |
| UA2 in HDDA comparative | E.6 | 100 | 0 | 224 000 |
|  | E.7 | 90 | 10 | 33 200 |
|  | E.8 | 80 | 20 | 11 200 |
|  | E.9 | 70 | 30 | 3000 |
|  | E.10 | 60 | 40 | 800 |

Application Examples

Determination of the performance properties of pendulum damping and Erichsen cupping of the acrylates and vinyl esters after UV curing.

The pendulum damping was determined along the lines of DIN 53157. For that purpose the radiation-curable compositions were applied in a wet film thickness of 400 µm to glass. The wet films were flashed off initially at room temperature for 15 minutes and then dried at 100° C. for 20 minutes. The films obtained in this way were cured in an IST coating unit (type M 40 2x1-R-IR-SLC-So inert) with 2 UV lamps (high-pressure mercury lamps type M 400 U2H and type M 400 U2HC) with a conveyor-belt speed of 10 m/min under a nitrogen atmosphere (oxygen content not more than 500 ppm). The radiation dose was approximately 1900 mJ/cm².

The Erichsen cupping was determined along the lines of DIN 53156. For that purpose the respective preparation of the invention was applied, using a box-section doctor blade, in a wet film thickness of 200 µm to BONDER metal panel 132. Curing was carried out by exposure in the manner described above. Thereafter the Erichsen cupping was determined by the pressing of a metal ball into the uncoated side of the metal panel. High values denote high flexibility.

-continued

|  | Example B | % by wt. UA1 | % by wt. ADVE | Viscosity [mPa·s] |
|---|---|---|---|---|
| UA1 in HDDA comparative | B.6 | 100 | 0 | 500000 |
|  | B.7 | 90 | 10 | 158720 |
|  | B.8 | 80 | 20 | 25600 |
|  | B.9 | 70 | 30 | 6080 |
|  | B.10 | 60 | 40 | 1560 |

| Example | Pendulum damping [s] | | Erichsen cupping [mm] | |
|---|---|---|---|---|
| Curing temperature | 23° C. | 100° C. | 23° C. | 100° C. |
| A.4 | 151 | 169 | 1.2 | 3 |
| A.9 (compar.) | 192 | 199 | 0.7 | 2.2 |
| B.4 | 142 | 155 | 3.5 | 4.9 |
| B.9 (compar.) | 97 | 161 | 5 | 4.5 |
| C.4 | 95 | 155 | 2.7 | 3.9 |
| C.9 (compar.) | 111 | 137 | 2.6 | 3.6 |
| D.4 | 39 | 78 | 4.1 | 2.2 |
| D.9 (compar.) | 71 | 85 | 4.1 | 3.1 |
| E.4 | 160 | 158 | 0.8 | 0.5 |
| E.9 (compar.) | 158 | 167 | 0.8 | not measurable |

The invention claimed is:

1. A radiation-curable coating composition comprising
   (A) at least one compound having at least two (meth)acrylate groups which is selected from the group consisting of polyester(meth)acrylate, polyether(meth)acrylate, polycarbonate(meth)acrylate, epoxide(meth)acrylate, and urethane(meth)acrylate,
   (B) optionally, at least one compound having at least one ethylenically unsaturated group, different than (A),
   (C) divinyl adipate,
   (D) optionally, at least one solvent,
   (E) at least one photoinitiator, and
   (F) optionally, further typical coatings ingredients,
   wherein the fraction of divinyl adipate (C) as a proportion of the total of the radiation-curable ingredients (A)+(B)+(C) is at least 25% by weight, wherein the epoxide (meth)acrylate is the reaction product of (meth)acrylic acid with a member selected from the group consisting of bisphenol A diglycidyl ether, bisphenol F diglycidyl ether, 1,4-butanediol diglycidyl ether, 1,6 hexanediol diglycidyl ether, trimethylolpropane triglycidyl ether, pentaerythritol tetraglycidyl ether, 1,1,2,2-tetrakis[4-(2,3-epoxypropoxy)-phenyl]ethane (CAS No. [27043-37-4]), diglycidyl ether of polypropylene glycol (α,ω-bis(2,3-epoxypropoxy)poly(oxypropylene) (CAS No. [16096-30-3]) and of hydrogenated bisphenol A (2,2-bis[4-(2,3-epoxypropoxy)cyclohexyl]propane, CAS No. [13410-58-7]).

2. The coating composition according to claim 1, wherein the urethane(meth)acrylates are synthesized from
   (a) at least one organic aliphatic, aromatic or cycloaliphatic di- or polyisocyanate,
   (b) at least one compound having at least one isocyanate-reactive group and at least one (meth)acrylate group, and
   (c) optionally, at least one compound having at least two isocyanate-reactive groups.

3. The coating composition according to claim 2, wherein the diisocyanate is selected from the group consisting of 1-isocyanato-3,3,5-trimethyl-5-(isocyanatomethyl)cyclohexane (isophorone diisocyanate), 1,6 diisocyanatohexane, 4,4'-di(isocyanatocyclohexyl)methane, and 3(or 4),8(or 9)-bis(isocyanatomethyl)tricyclo[5.2.1.0$^{2,6}$]decane isomer mixtures.

4. The coating composition according to claim 2, wherein the polyisocyanate is a polyisocyanate containing isocyanurate and/or allophanate and/or biuret groups.

5. The coating composition according to claim 2, wherein the compound (b) is selected from the group consisting of 2-hydroxyethyl acrylate, 2 hydroxyethyl methacrylate, 2-hydroxypropyl acrylate, and 3 hydroxypropyl acrylate.

6. The coating composition according to claim 1, wherein the polyester(meth)acrylate is a (meth)acrylated polyester-polyol which is produced by reacting dihydric alcohols with dibasic carboxylic acids.

7. The coating composition according to claim 1, wherein the polyether(meth)acrylate is a completely (meth)acrylated, alkoxylated polyol of the formulae (Ia) to (Id)

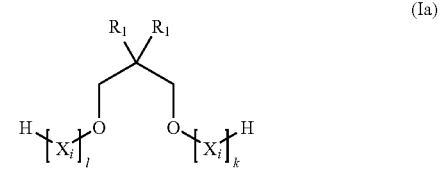

(Ia)

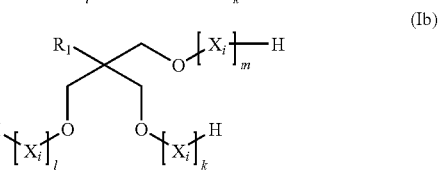

(Ib)

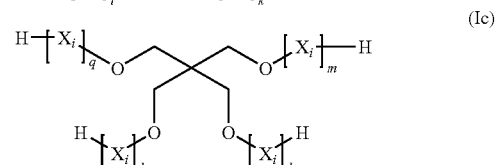

(Ic)

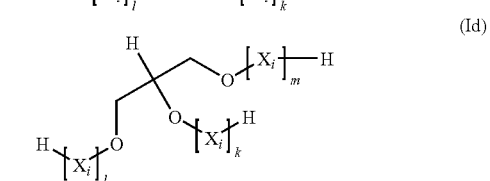

(Id)

in which
R$^1$ and R$^2$ independently of one another are hydrogen or unsubstituted or aryl-, alkyl-, aryloxy-, alkyloxy-, heteroatom- and/or heterocycle-substituted C$_1$-C$_{18}$ alkyl,
k, l, m, and q independently of one another are each an integer from 1 to 10, and
each X$_i$ for i=1 to k, 1 to l, 1 to m, and 1 to q may be selected, independently of any other, from the group consisting of —CH$_2$—CH$_2$—O—, —CH$_2$—CH(CH$_3$)—O—, —CH(CH$_3$)—CH$_2$—O—, CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O—, and —CHPh-CH$_2$—O—,
in which Ph is phenyl and Vin is vinyl.

8. The coating composition according to claim 1, wherein said fraction of divinyl adipate is at least 30% by weight.

9. The coating composition according to claim 1, wherein said fraction of divinyl adipate is 25% to 60% by weight.

10. The coating composition according to claim 1, wherein said fraction of divinyl adipate is 30% to 50% by weight.

* * * * *